(12) United States Patent
Yoon (10) Patent No.: US 7,426,073 B2
(45) Date of Patent: Sep. 16, 2008

(54) DIGITAL MICROMIRROR DEVICE AND MANUFACTURING METHOD THEREOF

(75) Inventor: Yun Hyun Yoon, Cheongju-si (KR)

(73) Assignee: Dongbu Electronics Co., Ltd., Seoul (KR)

( * ) Notice: Subject to any disclaimer, the term of this patent is extended or adjusted under 35 U.S.C. 154(b) by 123 days.

(21) Appl. No.: 11/518,079

(22) Filed: Sep. 8, 2006

(65) Prior Publication Data

US 2007/0051987 A1   Mar. 8, 2007

(30) Foreign Application Priority Data

Sep. 8, 2005   (KR) .................. 10-2005-0083670

(51) Int. Cl.
*G02B 26/00* (2006.01)
*G02B 26/08* (2006.01)
*G02B 7/182* (2006.01)

(52) U.S. Cl. ............... 359/294; 359/290; 359/291; 359/223; 359/226; 359/872

(58) Field of Classification Search .......... 359/290, 359/291, 294, 295, 196, 223, 226, 871, 872; 257/232

See application file for complete search history.

(56) References Cited

U.S. PATENT DOCUMENTS

| | | | | |
|---|---|---|---|---|
| 5,926,309 A | * | 7/1999 | Little | 359/293 |
| 6,825,968 B2 | * | 11/2004 | Aubuchon | 359/290 |
| 7,145,711 B2 | * | 12/2006 | Aubuchon | 359/290 |

* cited by examiner

*Primary Examiner*—Ricky Mack
*Assistant Examiner*—Jack Dinh
(74) *Attorney, Agent, or Firm*—Saliwanchik, Lloyd & Saliwanchik (57) ABSTRACT

Provided is a digital micromirror device (DMD). The DMD includes a first metal line, a second metal line, a third metal line, and a mirror. The first metal line is formed to have a predetermined line width and a predetermined thickness, and the second metal line is formed to have the same width and thickness as the first metal line. The third metal line is formed to have its own predetermined line width and predetermined thickness, and the mirror rotates according to a voltage applied to the first, second and third metal lines to reflect light incident thereto.

18 Claims, 9 Drawing Sheets
(2 of 9 Drawing Sheet(s) Filed in Color)

(Related Art)

DIGITAL MICROMIRROR DEVICE AND MANUFACTURING METHOD THEREOF

RELATED APPLICATION

This application claims the benefit under 35 U.S.C. § 119 (e), of Korean Patent Application Number 10-2005-0083670 filed Sep. 8, 2005, which is incorporated herein by reference in its entirety.

FIELD OF THE INVENTION

The present invention relates to a digital micromirror device, and more particularly, to a digital micromirror device (DMD) and a manufacturing method thereof, capable of improving a contrast.

BACKGROUND OF THE INVENTION

As the demand for digital broadcasting-related technology increases, a digital light processing (DLP) technology capable of realizing high resolution is in the limelight. Particularly, the digital micromirror device (DMD) is used for digital light processing systems and serves as a kind of a light switch display device for switching a reflection angle of light to two modes by changing the position of a micromirror in a range of +10 to (−10)°. Intensity of light is controlled using a time for which light is transmitted at a predetermined angle.

A DMD has several hundred thousand to several million micromirror arrays corresponding to pixels for an image to be displayed formed using a semiconductor process. An angle of a mirror is controlled using a voltage applied to each mirror, thereby controlling image data of each pixel.

Figure 1:
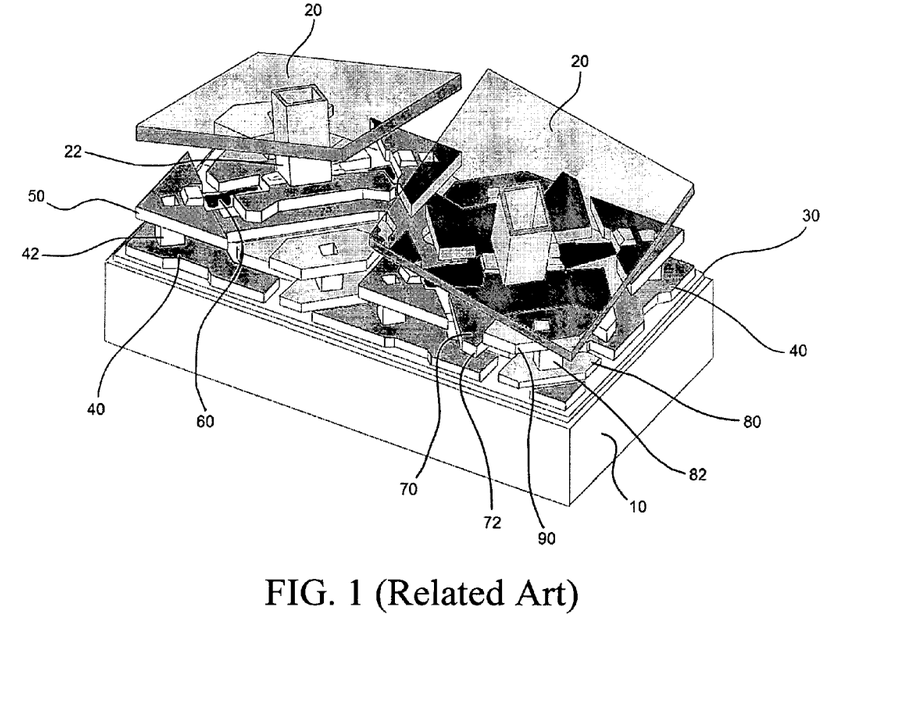
FIG. 1 is a schematic view of a sub-pixel of a DMD according to the related art.
Figure 2:
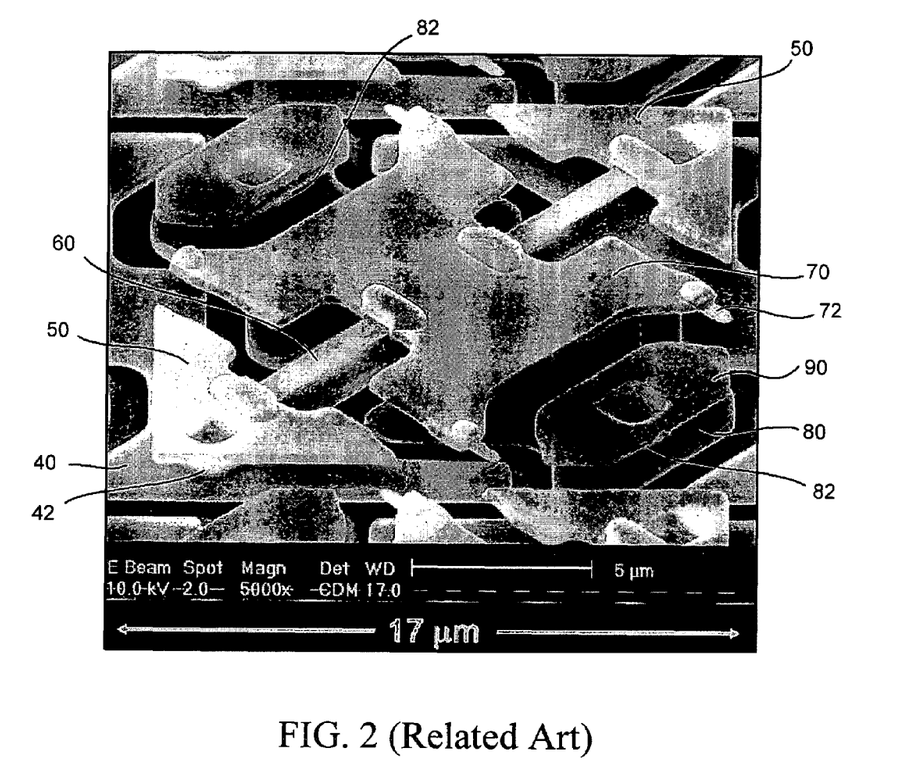
FIG. 2 is a photo of a sub-pixel of a DMD according to the related art.

FIG. 1 is a schematic view of a sub-pixel of a digital micromirror device according to a related art, and FIG. 2 is a photo of a sub-pixel of a digital micromirror device according to the related art.

Referring to FIGS. 1 and 2, the sub-pixel of the digital micromirror device includes a complementary metal oxide semiconductor (CMOS) address circuit board substrate 10, an insulating layer 30, a bias/reset electrode 40, a yoke address electrode 80, first spacers 42, hinge supporters 50, a hinge 60, a yoke 70, a mirror supporter post 22, a mirror 20, second spacers 82, and a mirror address electrode 90.

The hinge supporters 50 are formed in a triangular shape on the first spacer 42 to face the bias/reset electrode 40. The hinge 60 is rotatably connected between hinge supporters 50 formed in a diagonal direction. The yoke 70 is formed in an "H" shape on the hinge 60 and inclined in a range of +10- to (−10)° depending on an address voltage applied to the yoke address electrode 80. A yoke landing tip 72 serving as a spring is formed on each corner of the yoke 70.

The mirror supporter post 22 is formed at a center of the yoke 70 to support the mirror 20, and simultaneously, allow the yoke 70 to be separated a predetermined distance from the mirror 20.

The second spacers 82 are formed a predetermined distance apart in a diagonal direction from each other on the yoke address electrode 80 to support the mirror address electrode 90, and simultaneously, allow the yoke address electrode 80 to be separated a predetermined distance from the mirror address electrode 90.

The mirror address electrode 90 is formed on the second spacer 82 to face the yoke address electrode 80. The mirror address electrode 90 is electrically connected to the yoke address electrode 80 through a via hole formed in the second spacer 82.

The mirror 20 is formed on the mirror supporter post 22 to reflect light incident thereto.

Figure 3:
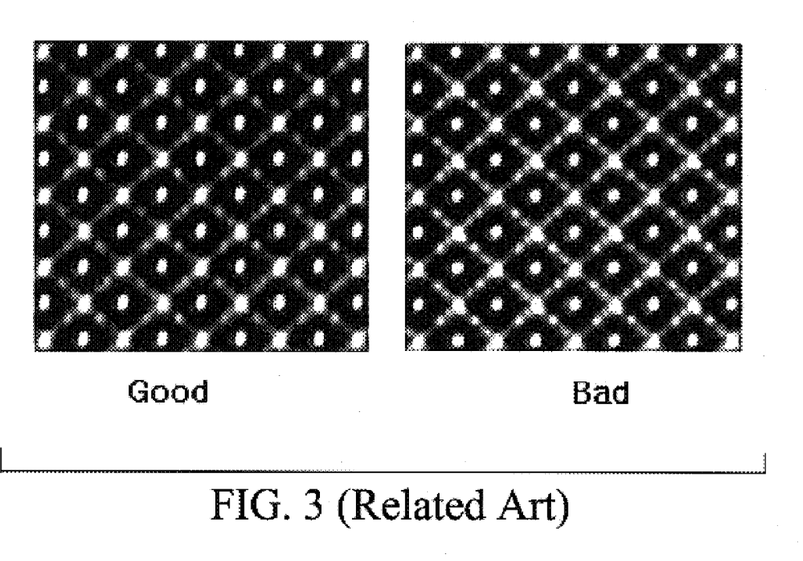
FIG. 3 is a photo image of an off-state of a DMD according to the related art, viewed from a front side.

FIG. 3 is a photo image of an off state of a digital micromirror according to a related art, viewed from a front side.

Referring to FIG. 3, a photo image at the left side shows a good state, and a photo image at the right side shows a bad state. In FIG. 3, rhombuses of white spots are spread over all directions. The rhombus means one pixel. The white spots appearing as vertexes of the rhombus, the four sides, and the central point of each rhombus represent light that is incident from a light source reflected by the mirror 20. The white spots appearing as vertexes and four sides of the rhombus represent light reflected to a gap between mirrors 20 of adjacent pixels. Here, the light is due to a metal line formed on a rear side of the mirror 20. The white spot appearing as the central point represents reflected light from the mirror 20 itself. Particularly, examination of FIG. 3 shows that a reflected light amount from the vertexes and the four sides of the rhombus in the photo image at the right side is greater than the reflected light amount in the photo image at the left side.

Figure 4:
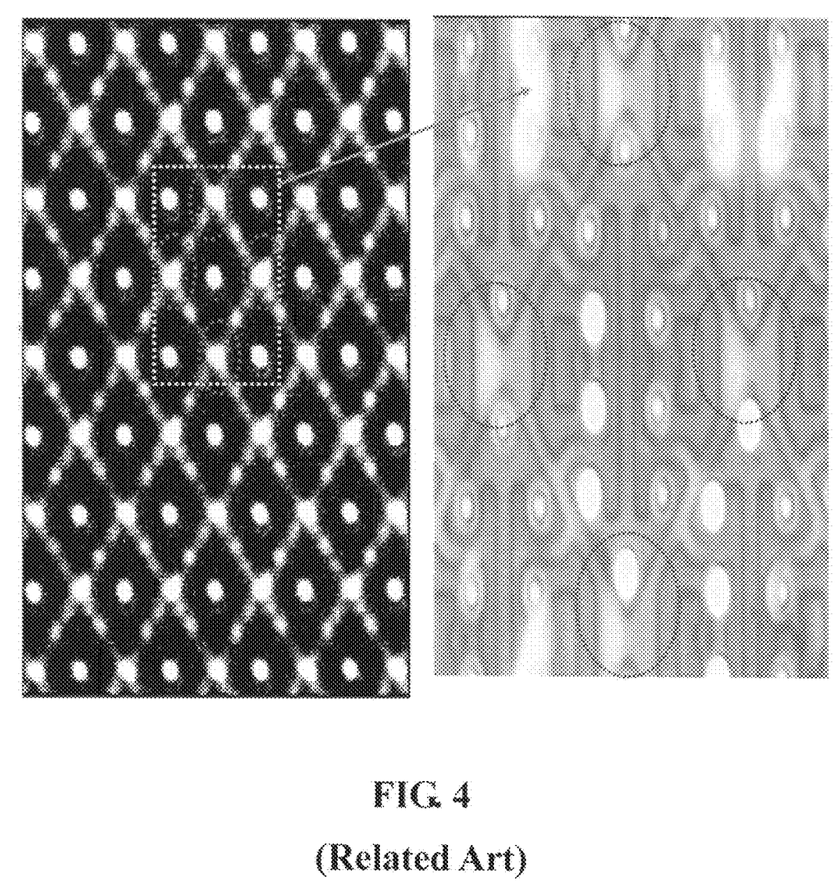
FIG. 4 is a front photo image by a microscope, illustrating a related art DMD after an arc hole is formed.

FIG. 4 is a front photo image by a microscope, illustrating a related art digital micromirror device after an arc hole is formed.

In FIG. 4, the image on the left is similar to the image on the right in FIG. 3. The image on the right is a microscope image of the region shown as a box in the image on the left. Referring to the image on the right, the blue color is a third metal line, and the yellow color is a first metal line and a second metal line formed below the third metal line.

Referring to FIG. 4, the white spots of FIG. 3 at the vertexes and sides of the rhombus coincide with a yellow region.

Figure 5:
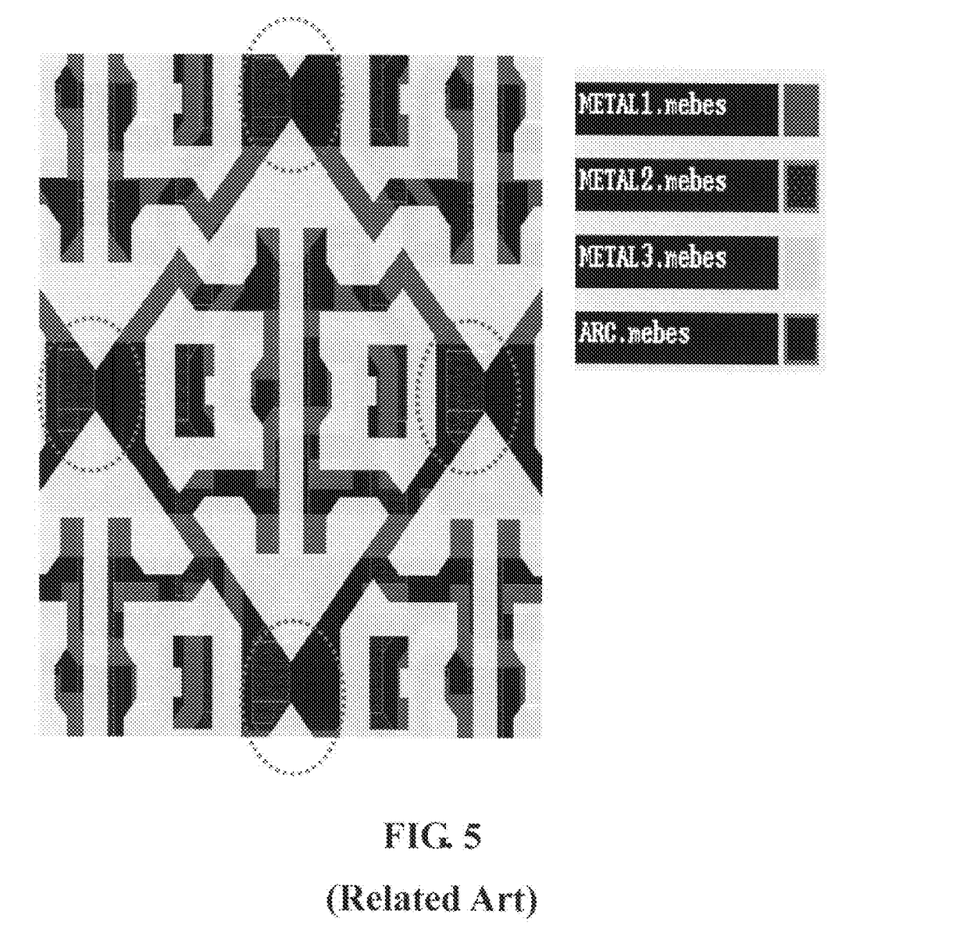
FIG. 5 is a view illustrating a layout of the sub-pixel illustrated in FIG. 2.

FIG. 5 is a view illustrating a layout of the sub-pixel illustrated in FIG. 2.

Referring to FIG. 5, a white spot region includes the first and second metal lines, which are visible at the gaps. Light reflected by the first and second metal lines is reflected through a gap A between adjacent mirrors 20 in an off-state.

Therefore, a primary vector reducing a contrast of an off-state is the light reflected by the first and second metal lines.

Consequently, the related art digital micromirror device 20 has a problem that a contrast is reduced by light reflected through a gap between mirrors 20 of adjacent pixels due to metal lines formed on a rear side of the mirrors 20.

SUMMARY OF THE INVENTION

Accordingly, the present invention is directed to a DMD and a manufacturing method thereof that addresses and/or substantially obviates one or more problems, limitations, and/or disadvantages of the related art.

An object of the present invention is to provide a DMD and a manufacturing method thereof, capable of enhancing a contrast.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a DMD including: a first metal line formed having a predetermined line width and a predetermined thickness; a second metal line formed above the first metal line and having the same line width and thickness as the first metal line; a third metal line formed above the second metal line and having a second predetermined line width and a second predetermined thickness; and a mirror for reflecting light incident thereon, wherein the mirror rotates according to a voltage applied to the first, second, and third metal lines.

In another aspect of the present invention, there is provided a method for manufacturing a DMD, the method including: forming a first metal line having a predetermined line width and a predetermined thickness; forming a second metal line above the first metal line and having the same line width and thickness as the first metal line; forming a third metal line above the second metal line and having a second predetermined line width and a second predetermined thickness; and providing a mirror for reflecting light incident thereto, wherein the mirror rotates according to a voltage applied to the first, second, and third metal lines.

It is to be understood that both the foregoing general description and the following detailed description of the present invention are exemplary and explanatory and are intended to provide further explanation of the invention as claimed.

BRIEF DESCRIPTION OF THE DRAWINGS

The file of this patent or patent application contains at least one drawing executed in color. Copies of this patent or patent application publication with color drawings will be provided by the Patent and Trademark Office upon request and payment of the necessary fee.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

A DMD having a structure as shown in FIGS. 1 and 5, according to an embodiment of the present invention includes: a first metal line formed to have a line width of 0.6 ±0.06 μm and a thickness of 600 ±25 Å; a second metal line formed to have the same width and thickness as those of the first metal line; a third metal line formed to have a line width of 0.8 ±0.1 μm and a thickness of 600 ±25 Å; and a mirror rotating according to a voltage applied to the first, second, and third metal lines to reflect light incident thereto.

Also, the DMD according to an embodiment of the present invention further includes a first interlayer insulating layer formed between the first and second metal lines, and a second interlayer insulating layer formed on the second metal line.

In a specific embodiment, each of the first and second interlayer insulating layers can be formed to have a thickness of 10,500 ±800 Å.

Analysis of a thickness, a width, and a space for each layer in a DMD according to the present invention is given by Table 1 below.

TABLE 1

| Layer | Analysis | SPEC | 1st analysis | | | 2nd analysis | | |
| --- | --- | --- | --- | --- | --- | --- | --- | --- |
| | | | Center average | Edge average | Center-edge | good | bad | Good-bad |
| Arc hole | Thickness (Å) | 650 | 698.5 | 651 | 47.5 | 531 | 558 | −27.5 |
| 3rd metal line | Thickness (Å) | 600 | 841 | 786 | 55 | 759 | 823 | −64 |
| | Width (μm) | 1.14 | 1.31 | 1.29 | 0.02 | 1.235 | 1.18 | 0.06 |
| | Space (μm) | 1.47 | 1.255 | 1.28 | −0.03 | 1.265 | 1.335 | −0.07 |

TABLE 1-continued

| Layer | Analysis | SPEC | 1st analysis | | | 2nd analysis | | |
|---|---|---|---|---|---|---|---|---|
| | | | Center average | Edge average | Center-edge | good | bad | Good-bad |
| 2nd insulating layer | HDP | 6000 | 5740 | 5920 | −180 | 5630 | 5795 | −165 |
| | IMD CMP | 10000 | 9690 | 9250 | 440 | 9325 | 9430 | −105 |
| 2nd metal line | Thickness (Å) | 500 | 585 | 585 | 0.0 | 713 | 640 | 73 |
| | Width (μm) | 1.8 | 2.085 | 2.05 | 0.035 | 2.12 | 2.055 | 0.065 |
| | Space (μm) | 0.9 | 0.66 | 0.697 | −0.036 | 0.65 | 0.674 | −0.024 |
| 1st interlayer insulating layer | 1st IMD-1(Å) | 650 | 804 | 804 | 0.0 | 537 | 561 | −24 |
| | SOG(Å) | 5700 | 9935 | 10250 | −315 | 10200 | 10300 | −100 |
| | IMD CMP(Å) | 10000 | 11700 | 10950 | 750 | 11500 | 10750 | 750 |
| 1st metal line | Thickness (Å) | 500 | 592.5 | 563 | 29.5 | 659 | 658 | 0.5 |
| | Width (μm) | 0.9 | 1.08 | 1.15 | −0.07 | 1.17 | 1.15 | 0.02 |
| | Space (μm) | 1.08 | 0.845 | 0.872 | −0.027 | 0829 | 0.858 | −0.03 |

In the first analysis of Table 1, two points from a center and an edge are analyzed in order to check a structural difference between the center and the edge of a wafer. The analysis shows that a thickness of a center is thicker than that of an edge and that a space of an edge of a metal line is greater than a space of a center of the metal line.

Also, in the second analysis of Table 1, two points from a center and an edge of a good chip and a bad chip are analyzed. The analysis shows that a space of a metal line of a good chip is smaller than a space of a metal line of a bad chip, and that a thickness of a metal line of a good chip is smaller than a thickness of a metal line of a bad chip.

A process condition of a DMD according to an embodiment of the present invention is analyzed below.

Figure 6:
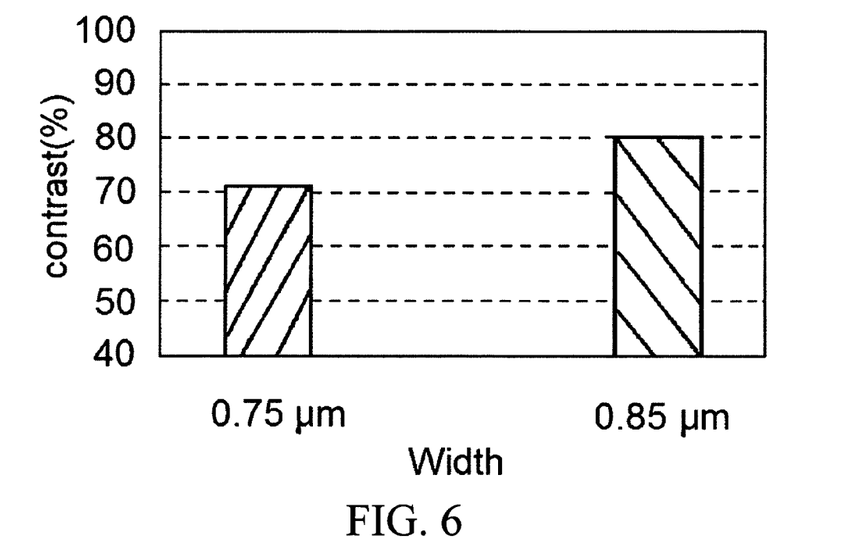
FIG. 6 is a graph illustrating a contrast according to line width split of a third metal line in a DMD according to an embodiment of the present invention.

First, referring to Table 1, as critical dimension (CD) of the third metal line decreases, a contrast can increase. For this purpose, when a line width of the third metal line is split with conditions of 0.75 μm (bit line) and 0.85 μm, a contrast increases from 71% (0.75 μm) to 80% (0.85 μm) as illustrated in FIG. 6. Therefore, when a space of third metal line decreases, a gap through which light is reflected by the first or second metal line formed on a backside of the third metal line at an off-state decreases, so that a light amount decreases, resulting in an improved contrast.

Correlation between a thickness and an arc hole of the third metal line, and a contrast, and reproductivity depending on a line width change of the third metal line are analyzed below.

Figure 7:
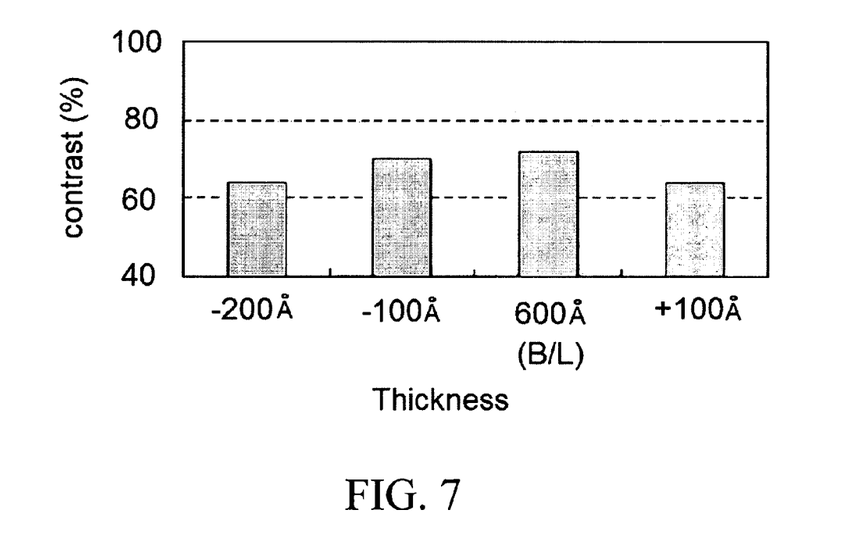
FIG. 7 is a graph illustrating a contrast according to thickness split of a third metal line in a DMD according to an embodiment of the present invention.
Figure 8:
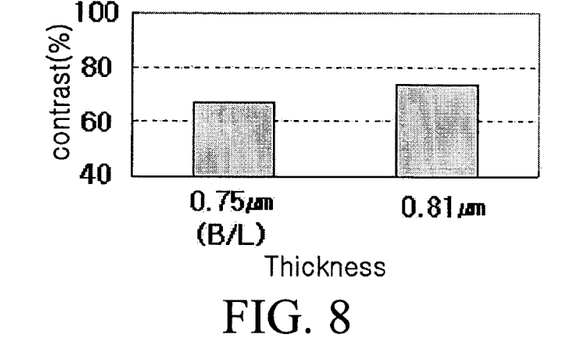
FIG. 8 is a graph illustrating a contrast according to line width split of a third metal line in a DMD according to an embodiment of the present invention.
Figure 9:
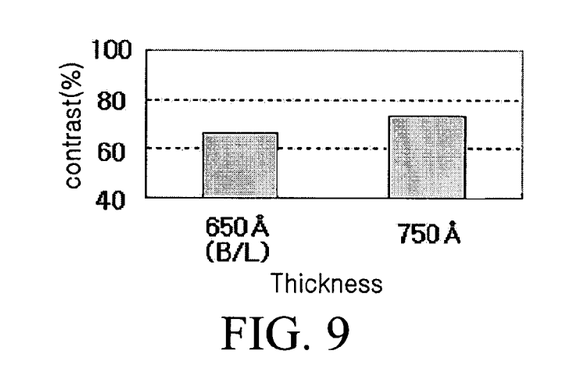
FIG. 9 is a graph illustrating a contrast according to a thickness split of an arc hole in a DMD according to an embodiment of the present invention.

First, referring to FIG. 7, a contrast by a thickness split of the third metal line has no difference between conditions. On the other hand, referring to FIG. 8, a contrast by a line width split of the third metal line is 74%, which is an improvement of 7%, compared to a contrast of 67% under a related art condition, as in the first split results. Also, referring to FIG. 9, a contrast by a thickness split of an arc hole is 74%, which is an improvement of 7%, compared to a contrast of 67% under a related art condition.

Meanwhile, a split experiment regarding thicknesses of the second and third metal lines and aluminum deposition temperature of the second metal line has been carried out in order to check reproductivity depending on a thickness in a split of the second and third metal lines, and an aluminum deposition temperature effect.

In this embodiment, the metal line can be formed in a stacked structure in which an Al-based metal and a TiN-based metal are stacked. Reflectivity can be controlled by controlling a width and a thickness of a metal line formed of the TiN-based metal.

Figure 10:
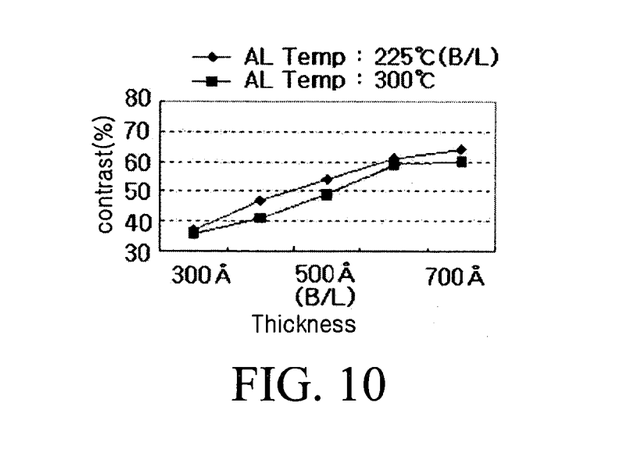
FIG. 10 is a graph illustrating a contrast according to a thickness of a second metal line and a deposition temperature in a DMD according to an embodiment of the present invention.

Referring to FIG. 10, this experiment shows that a contrast increases in proportion to the thicknesses of the second and third metal lines up to a thickness of 700 Å, and that the influence of the thickness of the second metal line is greater than the influence of the thickness of the third metal line.

Figure 11:
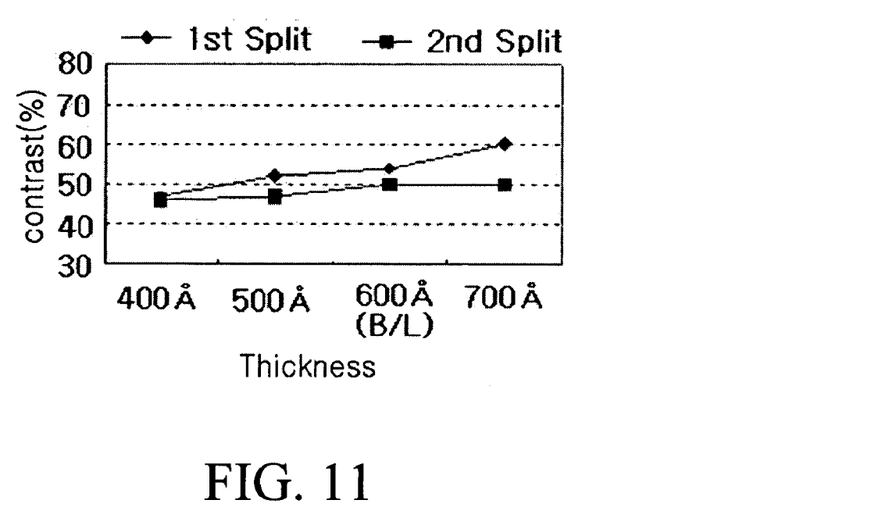
FIG. 11 is a graph illustrating a contrast according to thickness of a third metal line in a DMD according to an embodiment of the present invention.

Referring to FIG. 11, a comparison is made under a condition of an increased thickness of 700 Å rather than 600 Å, which is a thickness of the second metal line according to the related art. The comparison shows that the contrast increases by 4% compared to the related art.

Meanwhile, reflectivity according to a thickness change of the third metal line and an arc hole is measured below.

Figure 12:
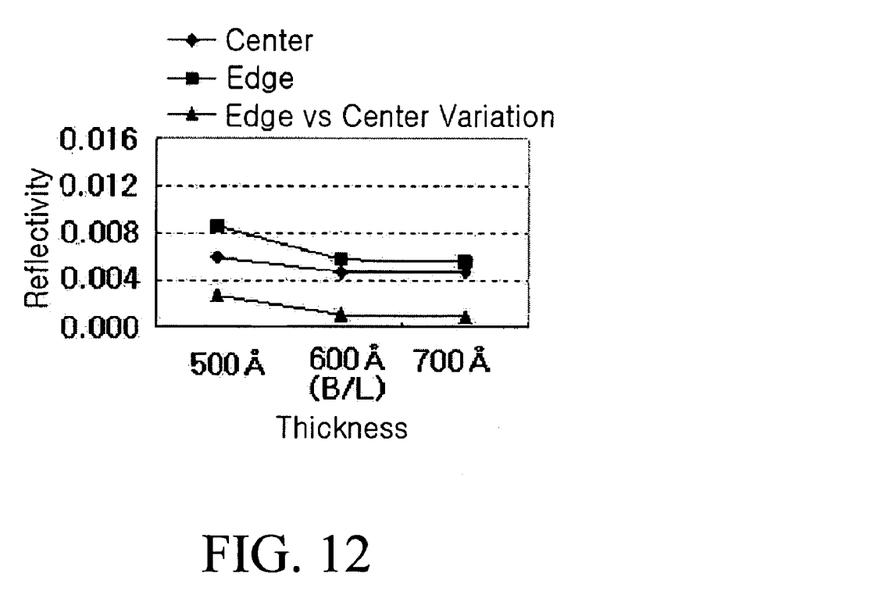
FIG. 12 is a graph illustrating reflectivity according to thickness split of a third metal line in a DMD according to an embodiment of the present invention.

Referring to FIG. 12, reflectivity due to the third metal line decreases as its thickness increases up to 700 Å. Reflectivity at a thickness of 700 Å is 0.0051. This reduction of reflectivity matches with the results showing that contrast increases as a thickness of the third metal line increases.

Figure 13:
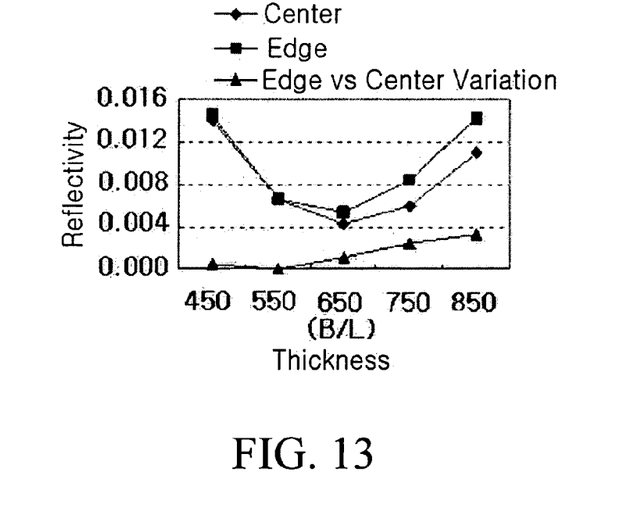
FIG. 13 is a graph illustrating reflectivity according to a thickness split of an arc hole in a DMD according to an embodiment of the present invention.

In the case of an arc hole, reflectivity is lowest at a related art condition, i.e., at a thickness of 650 Å. However, according to the split results of the arc hole, the contrast has increased under a thickness thicker by +100 Å than the thickness according to the related art. Such a difference is due to a thickness loss (about 100 Å) of the arc hole during a superstructure process, which is a final process. That is, when the arc hole is formed to a thickness of 650 Å, the arc hole changes to a thickness of 550 Å after the superstructure process. Accordingly, the arc hole should be formed to a thickness thicker by +100 Å than a thickness according to the related art. Referring to FIG. 13, considering that the contrast is excellent under a thickness thicker by +100 Å than a thickness according to the related art as in the above-described split result of the arc hole, and that the thickness of the arc hole changes from 750 Å to 650 Å, reflectivity matches with 0.0048, which is the lowest value at a thickness of 650 Å.

The above-described split results show that contrast increases as the thickness of the third metal line, the line width of the third metal line, and the thickness of an arc hole increase. In the split results and simulation according to Table 2 below, the optimum aluminum deposition temperature has been performed at 225° C. and 300° C.

TABLE 2

| Layer | Optimum condition |
| --- | --- |
| Arc hole | 700 ± 35 Å |
| Line width of third metal line (CD) | 0.8 ± 0.1 μm |
| Thickness of third metal line | 600 ± 25 Å |
| CMP of post via hole W | 10,500 ± 800 Å |
| CMP of second interlayer insulating layer | 10,500 ± 800 Å |
| Line width of second metal line | 0.60 ± 0.06 μm |
| Thickness of second metal line | 600 ± 25 Å |
| CMP of first interlayer insulating layer | 10,500 ± 800 Å |
| Thickness of first metal line | 600 ± 25 Å |
| Line width of first metal line | 0.60 ± 0.06 μm |

Figure 14:
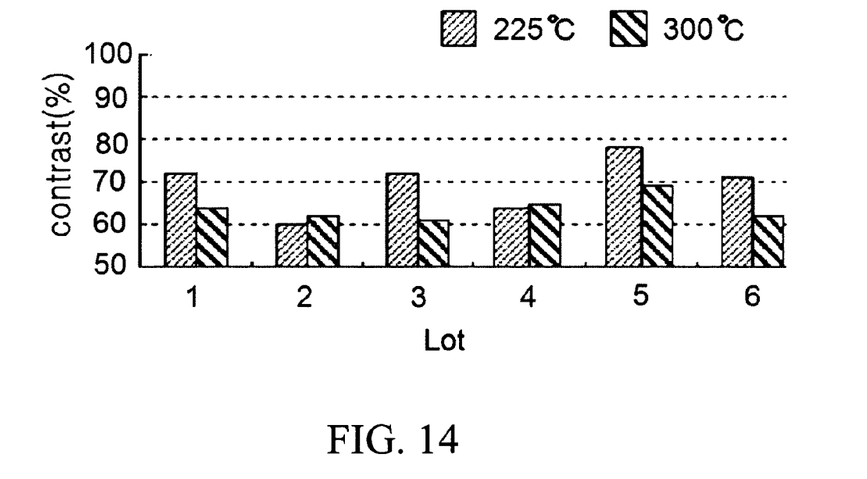
FIG. 14 is a graph illustrating a contrast for each lot according to an optimized condition and temperature in a DMD according to an embodiment of the present invention.

This split using the parameters of Table 2 has been performed on six lots. Referring to FIG. 14, split results show that an average contrast of six lots is 70% at a deposition temperature of 225° C. of a related art, and the average contrast is 64% at a deposition temperature of 300° C.

Accordingly, a DMD according to an embodiment of the present invention can increase a contrast by forming a width of a third metal line to 0.8 ±0.1 μm and a thickness of an arc hole to 700 ±35 Å.

It will be apparent to those skilled in the art that various modifications and variations can be made in the present invention. Thus, it is intended that the present invention covers the modifications and variations of this invention provided they come within the scope of the appended claims and their equivalents.

I claim:

1. A DMD (digital micromirror device) comprising:
   a first metal line having a predetermined line width and a predetermined thickness;
   a second metal line formed above the first metal line and having the same line width and thickness as the first metal line;
   a third metal line formed above the second metal line and having a second predetermined line width and a second predetermined thickness; and
   a mirror capable of rotating according to a voltage applied to the first, second, and third metal lines to reflect light incident thereto.

2. The DMD according to claim 1, further comprising:
   a first interlayer insulating layer having a third predetermined thickness and formed between the first and second metal lines; and
   a second interlayer insulating layer having a fourth predetermined thickness and formed between the second and third metal lines.

3. The DMD according to claim 2, wherein the first interlayer insulating layer has a thickness of 10,500 ±800 Å.

4. The DMD according to claim 2, wherein the second interlayer insulating layer has a thickness of 10,500 ±800 Å.

5. The DMD according to claim 2, further comprising an arc hole formed for electric connection on each of the first, second, and third metal lines.

6. The DMD according to claim 5, wherein the arc hole has a thickness of 700 ±35 Å.

7. The DMD according to claim 1, wherein the first metal line has a line width of 0.6±0.06 μm and a thickness of 600 ±25 Å.

8. The DMD according to claim 1, wherein the third metal line has a line width of 0.8 ±0.1 μm and a thickness of 600 ±25 Å.

9. The DMD according to claim 1, wherein the second and third metal lines comprise a TiN-based metal.

10. A method for manufacturing a DMD, the method comprising:
    forming a first metal line having a predetermined line width and a predetermined thickness;
    forming a second metal line above the first metal line and having the same line width and thickness as the first metal line;
    forming a third metal line above the second metal line and having a second predetermined line width and a second predetermined thickness; and
    providing a mirror for reflecting light incident thereto and capable of rotating according to a voltage applied to the first to third metal lines.

11. The method according to claim 10, further comprising forming a first interlayer insulating layer having a third predetermined thickness between the first and second metal lines, and a second interlayer insulating layer having a fourth predetermined thickness between the second and third metal lines.

12. The method according to claim 11, wherein the first interlayer insulating layer has a thickness of 10,500 ±800 Å.

13. The method according to claim 11, wherein the second interlayer insulating layer has a thickness of 10,500 ±800 Å.

14. The method according to claim 11, further comprising forming an arc hole for electric connection on each of the first to third metal lines.

15. The method according to claim 14, wherein the arc hole has a thickness of 700 ±35 Å.

16. The method according to claim 10, wherein the first metal line has a line width of 0.6 ±0.06 μm and a thickness of 600 ±25 Å.

17. The method according to claim 10, wherein the third metal line has a line width of 0.8 ±0.1 μm and a thickness of 600 ±25 Å.

18. The method according to claim 10, wherein the second and third metal lines comprise a TiN-based metal.

* * * * *